P. W. PRATT.
ELASTIC TIRE.
APPLICATION FILED APR. 12, 1915.
1,162,188. Patented Nov. 30, 1915.
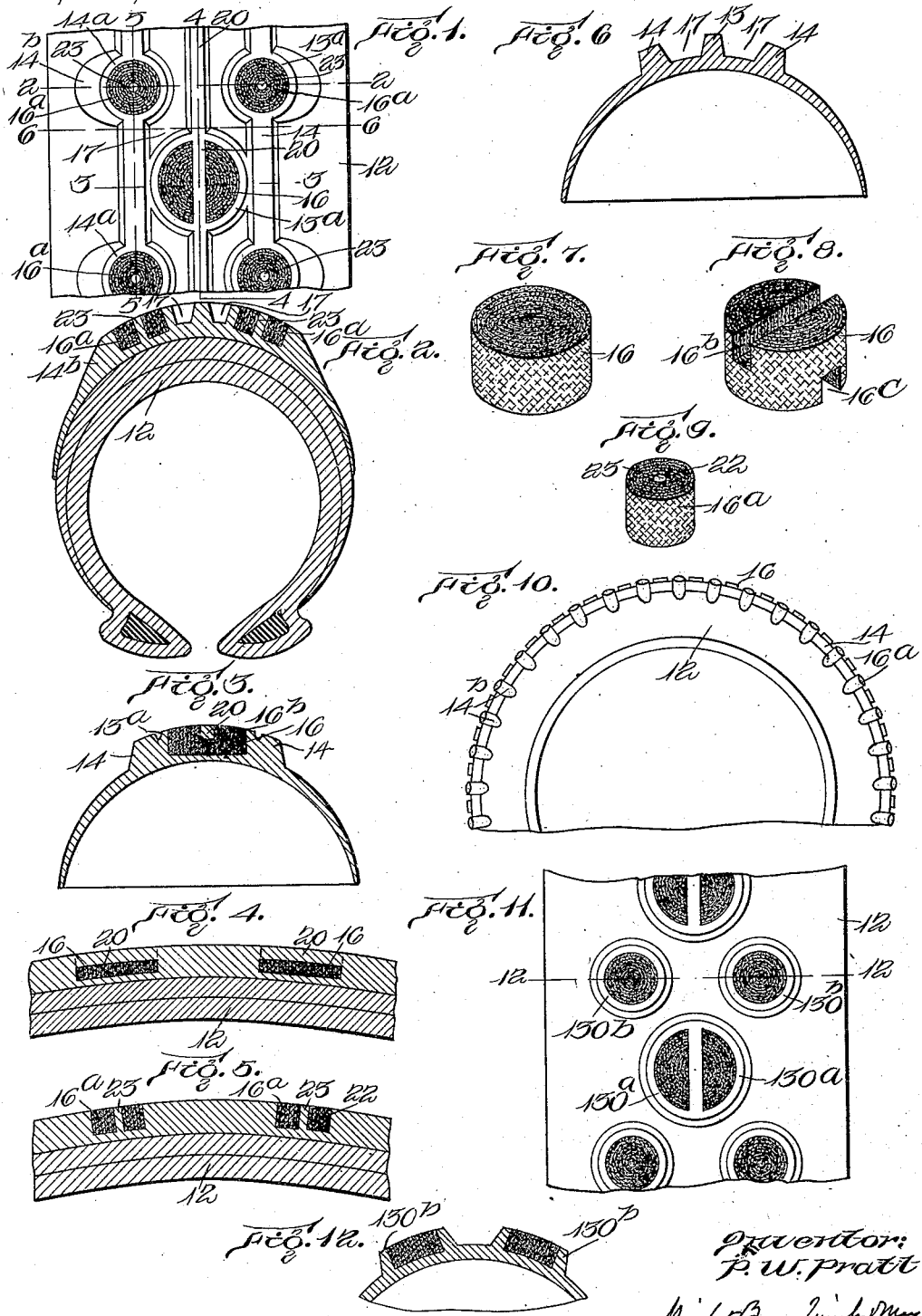

UNITED STATES PATENT OFFICE.

PHILIP W. PRATT, OF BOSTON, MASSACHUSETTS.

ELASTIC TIRE.

1,162,188.  Specification of Letters Patent.  Patented Nov. 30, 1915.

Application filed April 12, 1915. Serial No. 20,730.

*To all whom it may concern:*

Be it known that I, PHILIP W. PRATT, a citizen of the United States, and resident of Boston, in the county of Suffolk and State of Massachusetts, have invented certain new and useful Improvements in Elastic Tires, of which the following is a specification.

This invention relates to the tread portions of elastic tires, and particularly to the tread portion of a shoe or carcass forming an annular body adapted to contain an annular cushion, such as an inflated air tube or inner tube so called, although the improved tread portion embodying my invention may be carried by an annular body otherwise constructed and cushioned.

The invention has for its chief object to provide a tread portion formed as an elastic grid surrounding a tire body and adapted to effectively resist lateral skidding movements of the tire in directions parallel with its axis and peripheral slipping movements in a direction at right angles with its axis.

The invention consists in the improvements which I will now proceed to describe and claim.

Of the accompanying drawings forming a part of this specification: Figure 1 represents a plan view of a portion of a tire shoe embodying my invention; Fig. 2 represents a section on line 2—2 of Fig. 1; Fig. 3 represents a section on line 3—3 of Fig. 1; Fig. 4 represents a section on line 4—4 of Fig. 1; Fig. 5 represents a section on line 5—5 of Fig. 1; Fig. 6 represents a section on line 6—6 of Fig. 1; Fig. 7 represents a perspective view of one of the reinforcing plugs hereinafter referred to; Fig. 8 represents a perspective view of the plug shown by Fig. 7, showing its outer end indented to form a recess; Fig. 9 represents a perspective view of another plug; Fig. 10 represents a side elevation showing one half of a complete tire shoe or carcass. Fig. 11 represents a fragmentary plan view, showing a modification; Fig. 12 represents a section on line 12—12 of Fig. 11.

The same reference characters indicate the same or similar parts in all the views.

In the drawings, Figs. 1 to 10:—12 represents an annular tire body which is preferably a shoe or carcass formed to contain an inflated inner tube, and adapted to detachably engage a wheel rim. On said body are formed a series of outwardly projecting peripheral ribs having spaced enlargements, in which are inserted reinforcing anti-skidding and anti-slipping plugs, the ribs being of elastic rubber or a rubber composition, and the plugs being composed of textile fabric.

In the embodiment of the invention here illustrated the series of ribs comprises a central rib 13, provided with enlargements 13ª, and two side ribs 14, each provided with enlargements 14ª. In the enlargements 13ª are inserted plugs 16 and in the enlargements 14ª are inserted plugs 16ª, the enlargements being molded with sockets to receive said plugs, and the plugs being inserted before the rubber is completely vulcanized, and subsequently vulcanized to the walls of said sockets.

The enlargements 13ª and 14ª are in staggered relation to each other, and the enlargements 13ª are preferably of such width that they join the side ribs 14, as shown by Figs. 1 and 3. The enlargements 14ª are spaced from the central rib 13, so that irregular recesses 17 are formed between the ribs, the walls of said recesses being formed by the opposed sides of the ribs and enlargements, and said sides being preferably beveled to prevent the lodgment of dirt in said panels.

The plugs 16 and 16ª are each preferably formed by winding a strip of frictioned duck or canvas into a cylinder, the convolutions of the cylinder being caused to adhere to each other by the frictioning material and the strip being preferably cut on the bias, so that its threads are inclined relatively to the outer ends of the plugs and therefore are not capable of raveling. I do not limit myself however to this form and construction of the plugs, and may make the same of corrugated or plaited fabric as shown by my Patent 962,719, dated June 28, 1910.

It will now be seen that the ribs, their enlargements and the plugs constitute a raised grid on the outer surface of the body 12, and that said grid presents numerous shoulders formed by the sides of the ribs and enlargements resisting both skidding and slipping movements, these movements being further resisted by the plugs 16 and 16ª. Said plugs also reinforce the grid and prevent its tread surfaces from being crushed or inwardly displaced to an objectionable extent.

The outer sides of the enlargements 14ª are preferably extended to form buttresses 14ᵇ resisting lateral displacement of the side ribs 14.

The plugs 16 are preferably of greater diameter than the plugs 16ᵃ, and therefore more liable to be accidentally removed from their sockets. I prefer to overcome this liability by forming a transverse recess 16ᵇ (Fig. 8) in the outer side of each plug 16, by indenting said plug without removing material therefrom, and providing the enlargements 13ᵃ with integral confining bars 20 extending through said recesses, said bars being practically parts of the rib 13.

The ribs and enlargements are molded from unvulcanized rubber, and the plugs are inserted in the unvulcanized enlargements before the rubber is vulcanized, the vulcanizing process uniting the frictioned convolutions of the plugs to each other and uniting the plugs to the enlargements.

The inner ends of the plugs 16 may be provided with recesses 16ᶜ at right angles with the recesses 16ᵇ.

Figs. 11 and 12 illustrate a modification of my invention in which the ribs 13, 14, are omitted. The enlargements here designated by the reference characters 130ᵃ and 130ᵇ, are formed and relatively arranged like the enlargements 13ᵃ and 13ᵇ and are provided with reinforcing plugs, the sides of the enlargements being continuous instead of being interrupted by ribs between the enlargements.

In each of the above described embodiments of the invention the outer end faces of the enlargements and of the plugs inserted therein constitute tread faces, and the sides of the enlargements constitute shoulders facing in different directions, said tread faces and shoulders being adapted to resist skidding and slipping movements of the tire. I prefer the embodiment which includes the ribs 13 and 14 however, because said ribs increase the resistance to skidding movements.

Figs. 1, 2, 5 and 9 show central longitudinal orifices 22 in the plugs 16ᵃ, these being filled with cores 23 of unvulcanized rubber which are united by vulcanization to the rubber of the tire body and aid in preventing accidental removal of the cores from their sockets and add somewhat to the elasticity of the plugs. The plugs 16 may be similarly secured if desired. The cores 23 and the bars 20 previously described constitute plug-securing members of rubber inserted in openings in the plugs, and vulcanized to the portions of the tire in which the plugs are inserted, said members engaging and confining the central portions of the plugs. The plugs of frictioned textile fabric are sufficiently flexible to yield to compressing pressure and grip a wheel track, and are sufficiently rigid to prevent excessive distortion of the surrounding portions of the enlargements and of the intermediate portions of the ribs by pressure against the track.

Having described my invention, I claim:

1. An elastic tire comprising an annular body provided with a tread portion composed of a plurality of parallel peripheral elastic ribs surrounding the body and each provided with enlargements having sockets therein, the enlargements of each rib being in staggered relation with the enlargements of the next rib, and frictional reinforcing plugs of elastic textile material filling said sockets and vulcanized to the walls thereof, said ribs, enlargements and plugs forming a peripheral anti-skidding and anti-slipping grid, the plug portions of which are sufficiently flexible to yield to compressing pressure and grip a wheel track, and sufficiently rigid to prevent excessive distortion of the surrounding portions of the enlargements and of the intermediate rib portions by pressure against the track, the outer sides of the enlargements of the outside ribs being extended laterally to form buttresses to resist lateral displacement of said outer ribs.

2. An elastic tire comprising an annular body provided with a tread portion composed of peripheral elastic ribs surrounding the body and each provided with enlargements having sockets therein, the enlargements of each rib being in staggered relation with the enlargements of the next rib, the enlargements of the central rib joining the outer ribs, the outer sides of the enlargements of the outer ribs being extended to form buttresses, the sides of all of the ribs being beveled, and frictional reinforcing plugs of elastic textile material filling said sockets and vulcanized to the walls thereof, said ribs, enlargements and plugs forming a peripheral anti-skidding and anti-slipping grid, the plug portions of which are sufficiently flexible to yield to compressing pressure and grip a wheel track, and sufficiently rigid to prevent excessive distortion of the surrounding portions of the enlargements and of the intermediate rib portions by pressure against the track.

3. An elastic tire comprising an annular body provided with a tread portion composed of peripheral elastic ribs surrounding the body and each provided with enlargements having sockets therein, the enlargements of each rib being in staggered relation with the enlargements of the next rib, and frictional reinforcing plugs of elastic textile material filling said sockets and vulcanized to the walls thereof, and plug securing members of rubber vulcanized to said plugs and to the portions of the tire in which said plugs are inserted, said ribs, enlargements and plugs forming a peripheral anti-skidding and anti-slipping grid, the plug portions of which are sufficiently flexible to yield to compressing pressure and grip a wheel track, and sufficiently rigid to prevent excessive distortion of the surrounding portions of the enlargements and of the intermediate rib portions by pressure against the track.

4. An elastic tire comprising an annular body provided with a tread portion composed of peripheral elastic ribs, surrounding the body and each provided with enlargements having sockets therein, the enlargements of each rib being in staggered relation with the enlargements of the next rib, and frictional reinforcing plugs of elastic textile material filling said sockets and vulcanized to the walls thereof, the plugs of the central rib being indented transversely, and plug securing bars attached to the walls of the sockets in which they are inserted and engaging the indented portions of said plugs, said ribs, enlargements and plugs forming a peripheral anti-skidding and anti-slipping grid, the plug portions of which are sufficiently flexible to yield to compressing pressure and grip a wheel track, and sufficiently rigid to prevent excessive distortion of the surrounding portions of the enlargements and of the intermediate rib portions by pressure against the track.

5. An elastic tire comprising an annular body provided with a tread portion composed of peripheral elastic ribs surrounding the body and each provided with enlargements having sockets therein, the enlargements of each rib being in staggered relation with the enlargements of the next rib, and frictional reinforcing plugs of elastic textile material filling said sockets and vulcanized to the walls thereof, the plugs of the central rib being indented transversely, and plug securing bars attached to the walls of the sockets in which they are inserted and engaging the indented portions of said plugs, the plugs of the outside ribs having central plug securing stems attached to the bottoms of the sockets in which they are inserted and extending longitudinally through the plugs, said ribs, enlargements and plugs forming a peripheral anti-skidding and anti-slipping grid, the plug portions of which are sufficiently flexible to yield to compressing pressure and grip a wheel track, and sufficiently rigid to prevent excessive distortion of the surrounding portions of the enlargements and of the intermediate rib portions by pressure against the track.

In testimony whereof I have affixed my signature.

PHILIP W. PRATT.

Copies of this patent may be obtained for five cents each, by addressing the "Commissioner of Patents, Washington, D. C."